US009746131B2

(12) United States Patent
Hall et al.

(10) Patent No.: US 9,746,131 B2
(45) Date of Patent: Aug. 29, 2017

(54) ATTACHMENT SYSTEM

(75) Inventors: Edward R. Hall, Montreal (CA); Qi Wang, Dorval (CA); Stéphane Lebel, St. Redempteur (CA)

(73) Assignee: Revision Military S.a.r.L., Luxembourg (LU)

( * ) Notice: Subject to any disclaimer, the term of this patent is extended or adjusted under 35 U.S.C. 154(b) by 109 days.

(21) Appl. No.: 13/571,062

(22) Filed: Aug. 9, 2012

(65) Prior Publication Data
US 2013/0192029 A1 Aug. 1, 2013

Related U.S. Application Data

(63) Continuation-in-part of application No. 13/361,131, filed on Jan. 30, 2012, now abandoned.

(51) Int. Cl.
*F16M 13/04* (2006.01)
*F16G 11/10* (2006.01)
*G03B 17/56* (2006.01)

(52) U.S. Cl.
CPC ........... *F16M 13/04* (2013.01); *F16G 11/101* (2013.01); *G03B 17/561* (2013.01); *G03B 17/566* (2013.01); *Y10T 24/13* (2015.01); *Y10T 24/21* (2015.01); *Y10T 24/2192* (2015.01); *Y10T 29/49947* (2015.01)

(58) Field of Classification Search
CPC ......... A44F 5/006; B66F 17/00; B66F 17/006
USPC ......... 24/3.13, 300–301, 298, 129 A, 129 R, 24/115 H, 115 K, 136 R; 224/181, 908; 248/693; 2/6.2, 422
See application file for complete search history.

(56) References Cited

U.S. PATENT DOCUMENTS

| 790,929 A | | 5/1905 | Smith | |
|---|---|---|---|---|
| 928,469 A | * | 7/1909 | Miles | 135/118 |
| 2,819,923 A | | 1/1958 | Anderson | |

(Continued)

FOREIGN PATENT DOCUMENTS

| EP | 0 926 393 A1 | 6/1999 |
|---|---|---|
| EP | 1 698 802 A2 | 9/2006 |

(Continued)

OTHER PUBLICATIONS

International Search Report and Written Opinion for PCT/IB2013/000476 mailed Jul. 24, 2013.

(Continued)

*Primary Examiner* — Jack W Lavinder
(74) *Attorney, Agent, or Firm* — Wolf, Greenfield & Sacks, P.C.

(57) ABSTRACT

An attachment system is provided which may include a cord, a fastener coupled to a first portion of the cord, a tensioner coupled to a second portion of the cord, and a first fitting arranged to couple either the fastener or the tensioner to the cord. The tensioner is configured to retain a third portion of the cord to maintain the tension in the cord. An attachment system may include a first working component configured to be coupled to the cord, and a first fitting arranged to couple the first working component to the cord. The first working component may have a cavity configured to receive at least a portion of the first fitting, and the first fitting may have an actively moveable element configured to retain the cord when the first fitting is positioned in the working component cavity.

21 Claims, 6 Drawing Sheets

(56) References Cited

U.S. PATENT DOCUMENTS

| | | | |
|---|---|---|---|
| 3,328,064 A * | 6/1967 | Simon | 292/288 |
| 3,781,915 A | 1/1974 | Menold et al. | |
| 3,839,738 A * | 10/1974 | Coslett | 2/421 |
| 4,118,059 A * | 10/1978 | Lindsay | B66C 1/12 24/115 R |
| 4,270,679 A | 6/1981 | Gildea et al. | |
| 4,276,657 A | 7/1981 | Montesi | |
| 4,366,605 A | 1/1983 | McKenney | |
| 4,461,044 A | 7/1984 | Reiterman et al. | |
| 5,149,293 A * | 9/1992 | Gable | 450/86 |
| 5,307,751 A | 5/1994 | Shell | |
| 5,555,569 A | 9/1996 | Lane | |
| 5,638,551 A | 6/1997 | Lallemand | |
| 5,816,636 A * | 10/1998 | Gibson et al. | 294/82.14 |
| 5,987,652 A | 11/1999 | Fowler | |
| 5,987,707 A | 11/1999 | DeShon | |
| 5,987,711 A | 11/1999 | Parsons | |
| 6,058,578 A | 5/2000 | Lan | |
| 6,212,688 B1 | 4/2001 | Leslie | |
| 6,327,751 B1 * | 12/2001 | Ikeda | F16G 11/10 24/115 G |
| 6,348,859 B1 | 2/2002 | Baker | |
| 6,381,758 B1 * | 5/2002 | Roberts et al. | 2/421 |
| 6,389,655 B2 * | 5/2002 | Libecco | 24/300 |
| 6,442,763 B1 * | 9/2002 | Larson | A42B 1/046 2/171 |
| 6,675,447 B1 | 1/2004 | Hofeldt | |
| 7,036,189 B2 * | 5/2006 | Steigerwald | 24/300 |
| 7,039,987 B2 * | 5/2006 | van Gijsel et al. | 24/134 R |
| 7,430,789 B2 | 10/2008 | Wright | |
| 7,636,986 B2 | 12/2009 | Sorensen | |
| 7,856,699 B2 | 12/2010 | Sorensen et al. | |
| 8,087,270 B1 * | 1/2012 | Gruver | A42B 3/0413 24/298 |
| 8,839,494 B1 * | 9/2014 | Screens | 24/72.1 |
| 2001/0047573 A1 | 12/2001 | Anderson | |
| 2004/0118888 A1 | 6/2004 | Russell | |
| 2006/0096012 A1 | 5/2006 | DeGrunwald | |
| 2010/0012692 A1 | 1/2010 | Harris et al. | |
| 2010/0083413 A1 | 4/2010 | McGovern | |
| 2011/0041292 A1 | 2/2011 | Jolly et al. | |
| 2011/0113535 A1 | 5/2011 | Lebel et al. | |

FOREIGN PATENT DOCUMENTS

| | | |
|---|---|---|
| GB | 2 402 319 B | 7/2006 |
| WO | WO 03/033340 A1 | 4/2003 |
| WO | WO 2011/028966 A2 | 3/2011 |

OTHER PUBLICATIONS

International Preliminary Report on Patentability for PCT/IB2013/000476 mailed Aug. 14, 2014.

* cited by examiner

ATTACHMENT SYSTEM

RELATED APPLICATIONS

This application is a continuation-in-part of U.S. application Ser. No. 13/361,131, entitled "Attachment System," filed Jan. 30, 2012, which is herein incorporated by reference in its entirety.

FIELD

The present invention is directed to an attachment system for securing objects together, and more particularly to an attachment system which uses a cord to secure one or more objects together.

BACKGROUND

Cord attachment systems are commonly used to secure objects together. For example, a bungee cord may be used to secure cargo to the top of a vehicle. A bungee cord typically includes a hook fixed to each of its ends to secure the bungee cord to an object, such as a vehicle roof rack. The hooks may be wrapped several times around the ends of the bungee cord and the ends of the bungee cord may be knotted to retain the hook on the cord. Bungee cords are also used to secure other objects together, such as securing a tent to a stake in the ground.

Various types of attachment systems are also available to secure objects together. For example, rigid attachment systems, such as brackets and frames, are known to secure an object, such as a camera or a light, to another object, such as a helmet.

SUMMARY

According to one aspect, an attachment system is provided. The attachment system includes a cord having a first portion, a second portion and a third portion, with a fastener coupled to the first portion of the cord, and a tensioner coupled to the second portion of the cord. The tensioner is configured to retain the third portion of the cord in the tensioner to maintain the tension in the cord. The attachment system also includes a first fitting arranged to couple either the fastener to the cord or the tensioner to the cord.

According to another aspect, an attachment system for use with a cord is provided. The attachment system includes a first working component configured to be coupled to a first portion of a cord, and a first fitting arranged to couple the first working component to the first portion of the cord. The first working component has a cavity arranged to receive at least a portion of the first fitting, and the first fitting has an actively moveable element configured to retain the cord when the first fitting is positioned in the working component cavity.

According to yet another aspect, a method of attaching a first object to a second object is provided. The method includes attaching a fastener of an attachment system to a first object, where the fastener is configured to be coupled to a first portion of a cord, attaching the cord to a second object, and passing the cord through an opening in a tensioner of the attachment system, where the tensioner is configured to be coupled to a second portion of the cord. The method also includes coupling a first fitting to either the first portion of the cord or the second portion of the cord, securing the first fitting to either the fastener or the tensioner, and adjusting the position of the cord relative to the tensioner to adjust the tension in the cord.

Various embodiments of the present invention provide certain advantages. Not all embodiments of the invention share the same advantages and those that do may not share them under all circumstances.

Further features and advantages of the present invention, as well as the structure of various embodiments that incorporate aspects of the invention are described in detail below with reference to the accompanying drawings.

BRIEF DESCRIPTION OF DRAWINGS

The foregoing and other objects and advantages of the invention will be appreciated more fully from the following drawings, wherein like reference characters designate like features, in which.

DETAILED DESCRIPTION

Applicant recognized that there are problems associated with conventional attachment systems used to secure objects together. In particular, Applicant recognized that with some conventional cord attachment systems, it is difficult to adjust the tension in the cord. If there is insufficient tension in the cord, the attachment system may fail to keep the objects together. Applicant further recognized that with some conventional attachment systems, it is difficult to connect and/or disconnect portions of the attachment system to the cord.

Accordingly, aspects of the present invention are directed to a cord attachment system that permits adjustment of the tension in the cord. The attachment system may be configured such that the tension in the cord may be adjusted after the attachment system is coupled to multiple objects. As set forth in greater detail below, according to one embodiment, a cord tensioner is provided, and the cord tensioner may be positioned at one end of the attachment system. The cord tensioner is a component that receives a portion of the cord and is configured to grip or hold the cord to maintain the tension in the cord. The tension in the cord may be adjusted by varying the position of the cord in the tensioner.

Further aspects of the present invention are directed to an attachment system with a fitting that is configured to be easily connected and/or disconnected to the cord. As set forth in greater detail below, according to one embodiment, an attachment system is provided with a first fitting configured to couple a first working component to a first portion of the cord, and a second fitting configured to couple a second working component to a second portion of the cord.

Figure 1A:
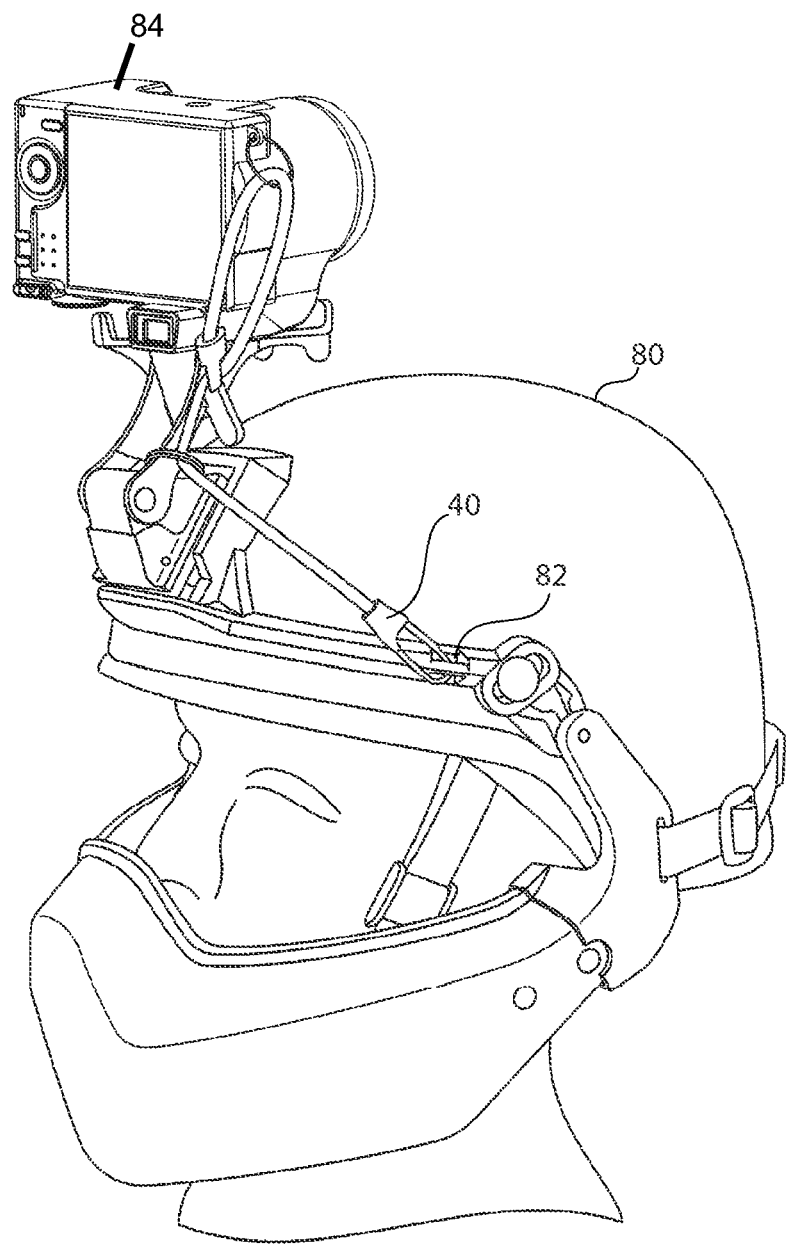
FIGS. 1A-1B are perspective views of an attachment system according to one embodiment coupling a helmet accessory to a helmet.
Figure 1B:
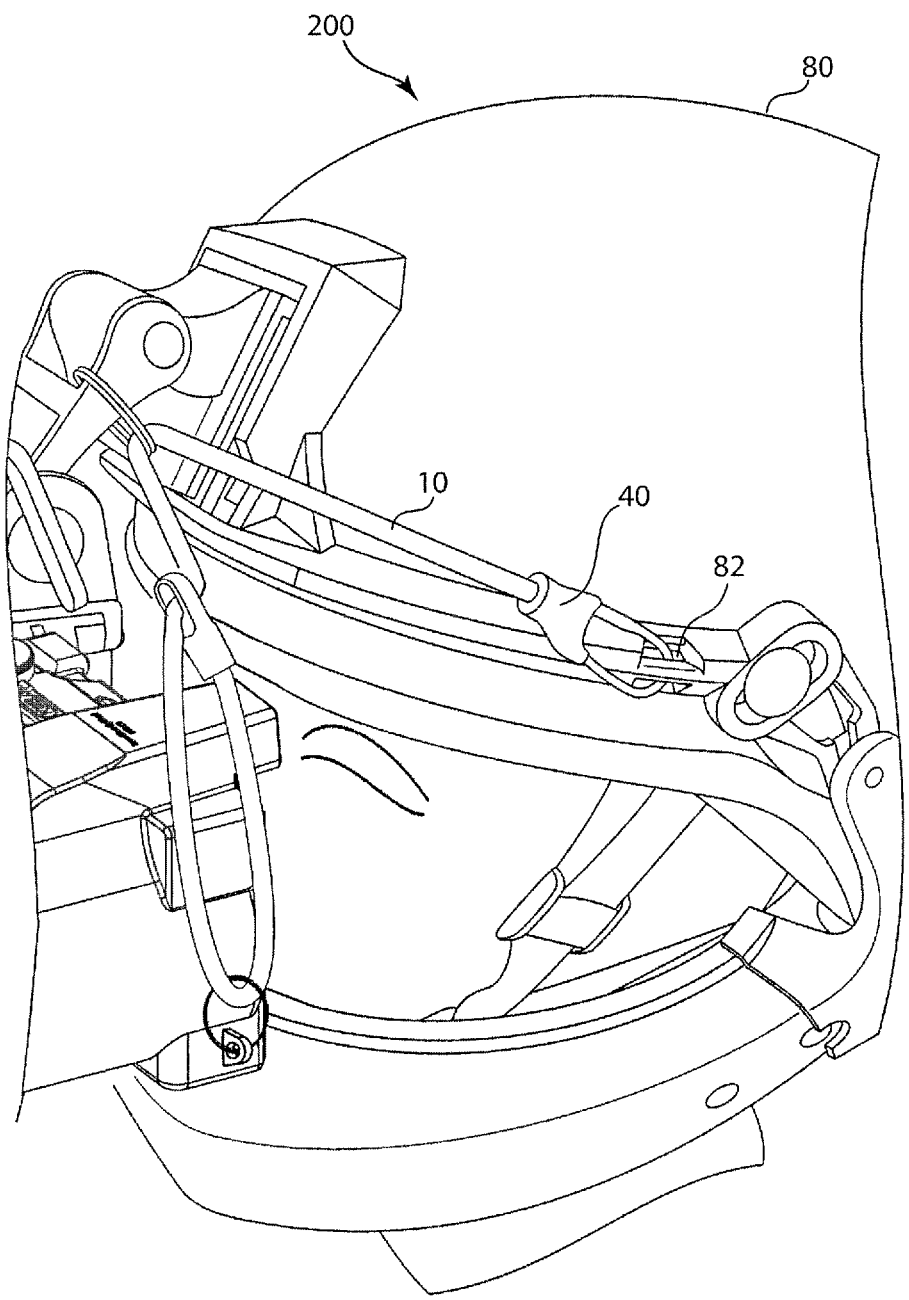

Turning now to the figures, FIGS. 1A-1B are perspective views of one embodiment of an attachment system 200 configured to couple a first object to a second object. The attachment system 200 illustrated in FIGS. 1A-1B includes a cord 10, and a fastener 40 coupled to the cord. The fastener 40 is configured to removably couple the cord to a first object, such as a helmet 80. In one illustrative embodiment, the helmet 80 has a slot 82 and the fastener 40 is configured to attach to the helmet slot 82.

The attachment system 200 also includes a tensioner 60 coupled to the cord 10. As set forth in more detail below, the tensioner 60 is configured to grip or hold a portion of the cord to maintain the tension in the cord 10. In one illustrative embodiment, the tensioner 60 has at least one tooth 64, 66 configured to grip a portion of the cord to maintain the tension in the cord. However, as set forth below, non-toothed tensioners 60 are also contemplated. As shown in FIGS. 1A-1B, the cord 10 may be coupled to a second object, such as a helmet accessory 84. As illustrated, the cord 10 is secured to one or more rings 86, 88 on the helmet accessory 84. FIG. 1A illustrates the helmet accessory 84 as a camera that is in a stowed position above the helmet, whereas FIG. 1B illustrates the camera in an "in use" position rotated down below the helmet 80.

In one illustrative embodiment, the fastener 40 is coupled to a first end 12 of the cord 10 and the tensioner 60 is coupled to a second end 14 of the cord. However, it is also contemplated that the fastener 40 and/or tensioner 60 are coupled to other portions of the cord, such as locations spaced apart from the first and second ends 12, 14, as the invention is not necessarily so limited. For example, it is contemplated that a portion of the cord may be folded over onto itself and the fastener 40 could be coupled to the folded portion of the cord.

As discussed in more detail below, and as shown in FIGS. 4-7, in one illustrative embodiment, the tensioner 60 has an opening 62. A portion of the cord 10 is passed through the opening 62 and the cord 10 is slid through the opening 62 until a desired cord tension is reached. Once the desired cord tension is reached, the tensioner 60 grips the cord 10 to prevent the cord 10 from moving relative to the tensioner 60, thus maintaining the tension in the cord. As set forth below, it should be appreciated that the present invention also contemplates embodiments where the tensioner 60 does not have an opening 62, as the invention is not necessarily limited in this respect.

In the illustrative embodiment in FIGS. 1A-1B, the attachment system 200 is configured to couple a helmet accessory 84 to a helmet 80. As set forth in greater detail below, it is also contemplated that the attachment system 200 may be configured to couple other objects together, as the invention is not necessarily limited in this respect.

Figure 2:
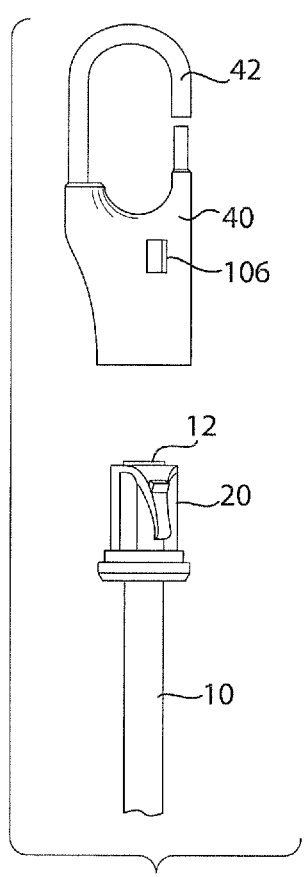
FIG. 2 is a perspective view of a portion of an attachment system according to one embodiment.
Figure 3:
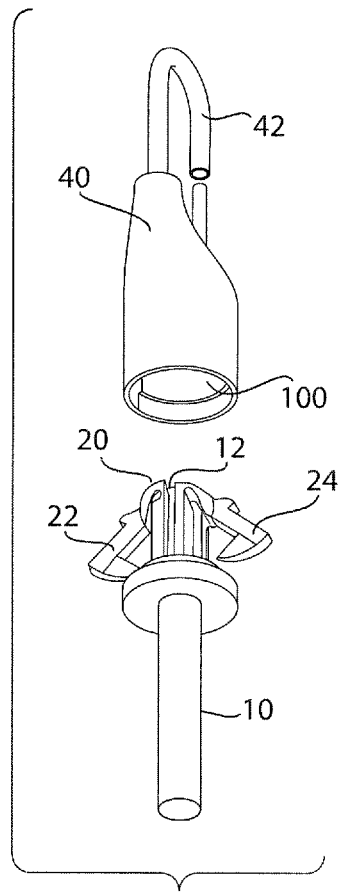
FIG. 3 is another perspective view of the attachment system illustrated in FIG. 2.
Figure 4:
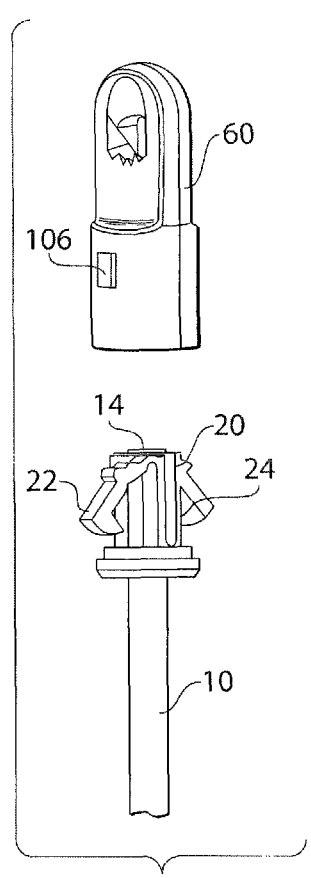
FIG. 4 is a perspective view of a portion of an attachment system according to one embodiment.
Figure 5:
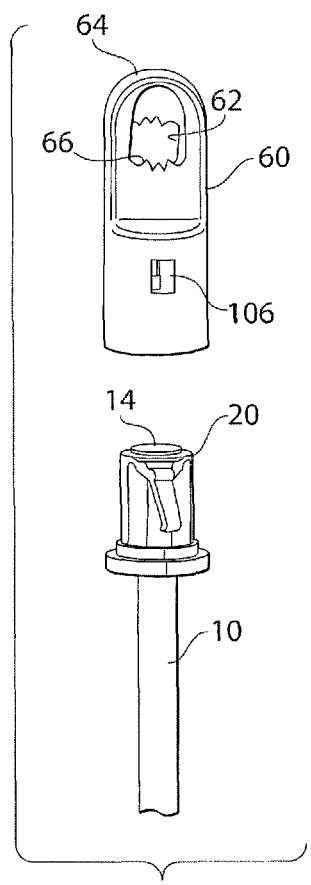
FIG. 5 is another perspective view of the attachment system illustrated in FIG. 4.

Now turning to FIGS. 2-3, the fastener 40 is illustrated in greater detail. As previously mentioned, the fastener 40 is configured to be coupled to the cord 10, and the fastener 40 is configured to removably couple the cord 10 to a first object, such as a helmet 80. In one illustrative embodiment, the fastener 40 is a hook 42 configured to engage with a portion of the first object. For example, as shown in FIGS. 1A-1B, the fastener 40 engages the slot 82 on the helmet 80. As shown in FIGS. 2-3, the fastener 40 may include a substantially C-shaped hook 42. In one embodiment, the hook 42 is non-movable. In another embodiment, one or more portions of the hook 42 may move, and may for example, pivot between an open position and a closed position. Although the drawings illustrate the fastener 40 as a hook 42, other fastener arrangements are also contemplated.

FIGS. 4-7 illustrate the tensioner 60 in greater detail. In this illustrative embodiment, there is a toothed tensioner. As previously mentioned, the tensioner 60 is configured to be coupled to the cord, and the tensioner 60 may include one or more teeth 64, 66 configured to retain a portion of the cord 10 to maintain the tension in the cord 10. In the embodiment illustrated in FIGS. 4-7, the tensioner has a plurality of teeth 64, 66. However, other embodiments contemplate a single tooth, or non-toothed tensioner arrangements, as the invention is not necessarily limited in this respect.

As mentioned above, the tensioner 60 may include an opening 62 extending therethrough, and as shown in FIGS. 1A-1B, the cord 10 may pass through the opening 62. The opening 62 is configured to receive the cord 10 such that the one or more teeth 64, 66 can grip a portion of the cord to maintain the tension in the cord. The tension in the cord 10 may be adjusted by varying the position of the cord 10 relative to the tensioner 60. For example, pulling on the cord in one direction will increase the tension in the cord 10. Sliding the cord 10 in the opposite direction will decrease the tension in the cord 10. Alternatively, the tensioner 60 may be displaced relative to the cord 10.

Figure 6:
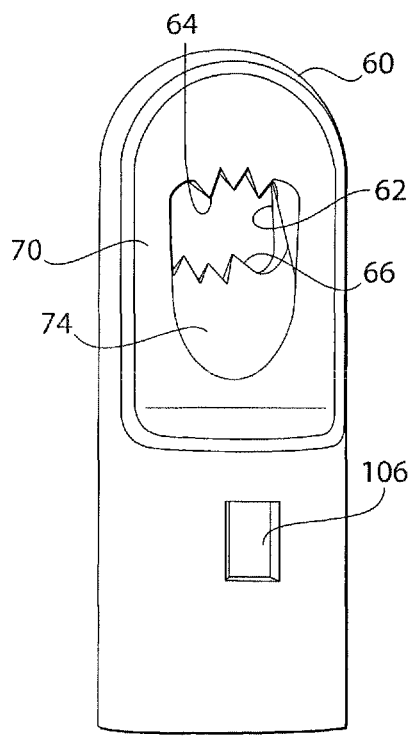
FIG. 6 is a perspective view of a tensioner according to one embodiment.
Figure 7:
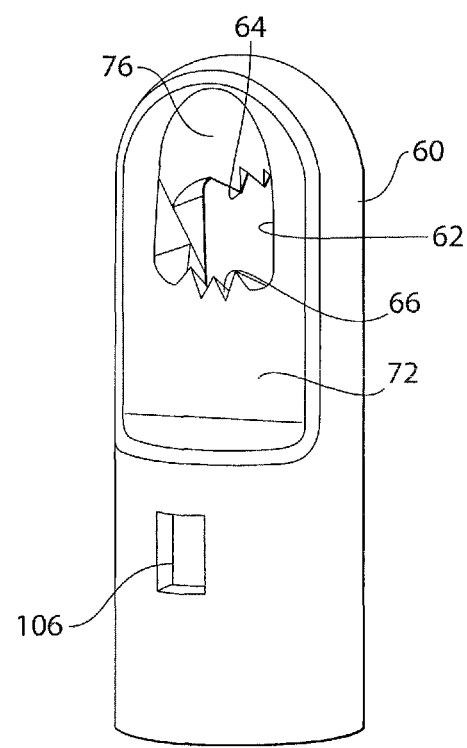
FIG. 7 is another perspective view of the tensioner illustrated in FIG. 6.

As illustrated in FIGS. 6-7, the tensioner 60 may include at least one tooth 64 positioned on a first side 70 of the tensioner 60 and at least one tooth 66 positioned on a second side 72 of the tensioner 60. In one illustrative embodiment, the second side 72 of the tensioner 60 is opposite the first side 70 of the tensioner. Applicant recognized that placing teeth on each side 70, 72 of the tensioner enables the teeth to adequately grip the cord, regardless of the orientation of the tensioner 60. Furthermore, by placing the teeth on each side of the tensioner 60, at least one tooth 64 is offset from at least one tooth 66. With such a configuration, the cord 10 is gripped by a plurality of teeth 64, 66 that are spaced apart along the length of the cord 10. It is contemplated that such a configuration further enables the tensioner 60 to grip the cord 10, and thus retain the tension in the cord 10.

In one embodiment, the tensioner 60 has a first plurality of teeth 64 positioned on a top portion of the opening 62, and a second plurality of teeth 66 positioned on a bottom portion of the opening 62, where the top portion of the opening 62 is farther away from the first end 14 of the cord 10 than the bottom portion of the opening 62. Applicant recognized that placing teeth on both the top and bottom portions of the opening 62 enables the teeth to grip two opposing surfaces of the cord. In one particular embodiment, the tensioner 60 includes three upper teeth 64 and three lower teeth 66 and each of the teeth are configured to grip the cord 10 to maintain the tension in the cord. It is also contemplated that in one embodiment, there are more than three upper and lower teeth, and in another embodiment, there may be less than three upper and lower teeth. Further, a different number of teeth may be provided respectively on the top and bottom portions.

The tensioner 60 may be shaped to facilitate the positioning of the cord 10 relative to the teeth 64, 66. For example, in one embodiment, one or more surfaces of the tensioner are curved to facilitate the sliding movement of the cord when adjusting the tension in the cord. In one illustrative embodiment, the tensioner has a first concave surface 74 on a first side 70 of the tensioner 60 adjacent the opening 62. The tensioner 60 may also have a second concave surface 76 on the second side 72 of the tensioner 60 adjacent the opening 62.

As mentioned above, it is also contemplated that the tensioner 60 may be configured without an opening 62. For example, the tensioner 60 may include one or more gripping elements, such as teeth 64, 66 positioned on an outer surface of the tensioner 60 and the gripping elements may be configured to grip the cord 10 to maintain the cord tension.

As mentioned above, non-toothed tensioners are also contemplated. For example, the tensioner 60 may include a clamp configured to press against the cord, thereby maintaining the tension in the cord. The clamp may receive a portion of the cord and the clamp may be spring-loaded to press against the cord.

One of ordinary skill in the art would recognize that the tensioner 60 and/or the fastener 40 may be coupled to the cord using a variety of known techniques, such as, but not limited to adhesives, mechanical fasteners, and knotting the cord around the tensioner or fastener.

Applicant recognized that it may be difficult to connect and/or disconnect portions of the attachment system to a cord using known techniques. Thus, Applicant developed an attachment system with a fitting 20 that is configured to be easily connected and/or disconnected to the cord. This fitting 20 is configured to couple working components, such as a fastener 40 and/or tensioner 60, to the cord. In one embodiment, the fitting is configured to removably couple the tensioner 60 and/or the fastener 40 to the cord 10. As set forth below, the fitting 20 is configured to receive a portion of the cord, such as one end 12, 14 the cord, and portions of the fitting 20 press against the cord to retain the cord in the fitting 20. The fitting 20 is configured to interact with a working component, such as a tensioner 60 or fastener 40 to couple the working component to the fitting 20.

In the embodiment illustrated in FIGS. 2-5 and 8, a fitting 20 is configured to couple the tensioner 60 and/or the fastener 40 to the cord 10. There may be a first fitting configured to couple the tensioner 60 to the cord 10, and a second fitting configured to couple the fastener 40 to the cord 10. As set forth below, in one embodiment, the fitting 20 enables the cord to be easily connected to the tensioner 60 and/or the fastener 40. In this respect, the cord may pass through the opening 62 in the tensioner, and the cord may also be secured to an object, such as by passing the cord through the rings 86, 88 on the helmet accessory 84. Thereafter, the fitting 20 may be coupled to the cord 10, the fitting 20 may be secured to either the fastener or the tensioner, and the position of the cord relative to the tensioner may be adjusted to vary the tension in the cord. The tensioner 60 and/or fastener 40 may be sized such that once secured to the cord, the cord cannot easily be passed through the opening 62 in the tensioner. Thus, the fitting 20 easily allows the components to be connected after the cord is passed through the tensioner opening 62.

In one illustrative embodiment, the tensioner 60 and/or fastener 40 has a cavity 100 constructed to receive at least a portion of the fitting 20. As illustrated, the fitting 20 has an actively moveable element 22, 24 configured to retain the cord when the fitting 20 is positioned in the cavity 100. In one embodiment, the actively moveable element 22, 24 is configured as at least one arm, and in the illustrated embodiment it is configured as a plurality of arms. It is also contemplated that the moveable element 22, 24 may be shaped and configured differently, such as, but not limited to ring-shaped.

The fitting 20 may have a hole 34 extending axially therethrough, and the hole 34 may be configured to receive a portion of the cord. In one illustrative embodiment, the hole 34 is configured to receive an end 12, 14 of the cord 10.

Figure 8:
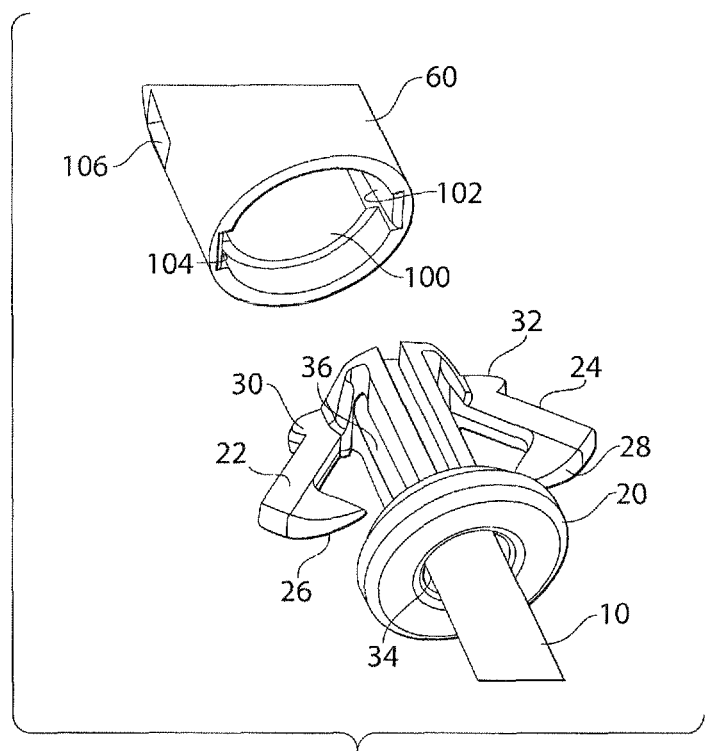
FIG. 8 is a perspective view of a portion of an attachment system according to one embodiment.

In another embodiment, it is also contemplated that the hole 34 is configured to receive another portion of the cord, and may, for example, be sized to receive a middle portion of the cord. As shown in FIG. 8, inserting a portion of the fitting 20 into the cavity 100 causes the actively moveable element 22, 24 to rotate inwardly and press against the cord, thus preventing movement of the cord 10 relative to the fitting 20. The inside of the cavity 100 may have a plurality of channels 102, 104 that align with the moveable element 22, 24. The channels 102, 104 may act as a track to guide movement of the fitting 20 into the cavity 100. The fitting 20 may interlock with the tensioner 60 and/or fastener 40 to couple the components together.

In one illustrative embodiment, the fitting 20 includes a first arm and a second arm, where the second arm is positioned opposite the first arm. Additional arms may also be provided. As mentioned above, other configurations for the actively moveable element 22, 24 are also contemplated.

In one embodiment, each of the arms of the actively moveable element 22, 24 include an inwardly facing projection 26, 28 configured to engage the cord when the fitting 20 is positioned in the cavity 100. The projection 26, 28 may have a pointed tip to grip the cord 10. In one illustrative embodiment, the plurality of arms may also include an outwardly facing detent 30, 32 configured to engage the tensioner 60 and/or fastener 40 when the fitting 20 is positioned in the cavity 100. For example, the outwardly facing detent 30, 32 may be configured to engage a recess 106 in the tensioner 60 and/or fastener 40 to provide an interference fit between the fitting 20 and the cavity 100. In another embodiment, there may be a snap-fit engagement between the two components. As illustrated in FIG. 8, the fitting 20 may include one or more openings 36 to enable the inwardly facing projections 26, 28 to directly contact the cord 10 when the cord 10 has been inserted into the hole 34 in the fitting 20.

In one embodiment, the fitting 20 is designed such that the components may not be easily decoupled once the components are assembled together. This may prevent the attachment system from undesirably disengaging with either of the first or second objects. For example, there may be an interference fit between the fitting 20 and the cavity 100 and a pin-like device may be required to press the moveable element 22, 24 inwardly to disengage the fitting 20 from the working component.

The drawings illustrate a fitting 20 configured to couple the tensioner 60 and/or the fastener 40 to the cord 10. It should also be appreciated that the fitting 20 may also be configured to couple other working components to a cord, as the invention is not necessarily so limited.

According to one embodiment, a method of attaching a first object to a second object is provided. The method includes attaching a fastener of an attachment system to a first object, where the fastener is configured to be coupled to a first portion of a cord, and attaching the cord to a second object. The cord is passed through an opening in a tensioner of the attachment system, and the tensioner is configured to be coupled to a second portion of the cord. A first fitting is coupled to either the first portion of the cord or the second portion of the cord, and the method further includes securing the first fitting to either the fastener or the tensioner, and adjusting the position of the cord relative to the tensioner to adjust the tension in the cord. It should be appreciated that the fitting enables the cord to pass through the tensioner and thereafter be easily connected to either the tensioner 60 or the fastener 40.

The present invention contemplates a variety of types of cords, as the invention is not necessarily limited in this respect. In one embodiment, the cord 10 is made of an elastic material, and may, for example, be made from a bungee cord. However, other embodiments of the present invention contemplate non-elastic materials. For example, the cord 10 may be made from string or wire. The size of the cord 10 may vary based upon the particular application. In one embodiment, the cord 10 has a substantially circular cross-section, and the diameter of the cord may range from approximately 1/16 inch to approximately 1 inch. In one particular embodiment, the diameter of the cord is approximately 3/16 inch. In one embodiment, the length of the cord may range from approximately 1 foot to approximately 10 feet. In one particular embodiment, the length of the cord is approximately 10 feet.

The other components of the attachment system 200 may be made from a variety of materials, as the invention is not necessarily limited in this respect. In one embodiment, the fastener 40, tensioner 60, and/or fittings 20 are made from plastic, and may for example be formed from a resin plastic. In another embodiment, the fastener 40, tensioner 60, and/or fittings 20 may be made from metal.

As mentioned above, in one embodiment, the attachment system 200 is configured to couple a helmet accessory 84 to a helmet 80. Examples of helmet accessories include, but are not limited to, a camera and a light. However, the present invention is not necessarily so limited. It is also contemplated that the attachment system 200 may be configured to couple other objects together, and may be configured as a cargo strap, or may be configured to stake a tent in the ground.

In the embodiment illustrated in FIGS. 1A-1B, the attachment system 200 is configured as a secondary attachment system, as there is also a conventional rigid frame attachment system 210 coupling the helmet accessory 84 to a helmet 80. In some circumstances, it may be desirable to have a secondary attachment system 200 to minimize damage that may occur to the objects in the event that the primary attachment system 210 fails. It is also contemplated that the attachment system 200 may be employed as a primary attachment system as the invention is not necessarily limited in this respect.

It should be appreciated that various embodiments of the present invention may be formed with one or more of the above-described features. The above aspects and features of the invention may be employed in any suitable combination as the present invention is not limited in this respect. It should also be appreciated that the drawings illustrate various components and features which may be incorporated into various embodiments of the present invention. For simplification, some of the drawings may illustrate more than one optional feature or component. However, the present invention is not limited to the specific embodiments disclosed in the drawings. It should be recognized that the present invention encompasses embodiments which may include only a portion of the components illustrated in any one drawing figure, and/or may also encompass embodiments combining components illustrated in multiple different drawing figures.

It should be understood that the foregoing description of various embodiments of the invention are intended merely to be illustrative thereof and that other embodiments, modifications, and equivalents of the invention are within the scope of the invention recited in the claims appended hereto.

What is claimed is:

1. A system comprising:
  a cord having a first portion, a second portion and a third portion, the third portion being between the first portion and the second portion of the cord, the cord being made of an elastic material;
  a fastener coupled to the first portion of the cord; and
  a tensioner coupled to the second portion of the cord, the tensioner having an opening extending therethrough, wherein the third portion of the cord extends through the opening and is gripped in the tensioner to maintain tension in the cord; wherein
  the tensioner has a first tooth positioned on a first side of the tensioner and on a top portion of the opening, and a second tooth positioned on a second side of the tensioner and on a bottom portion of the opening, the tensioner configured to grip the third portion of the cord with the first and second teeth to maintain tension in the cord;
  at the bottom portion of the opening, the first side has a first concave surface adjacent the opening and has no teeth;
  at the top portion of the opening, the second side of the tensioner has a second concave surface adjacent the opening and has no teeth; and wherein
  when the tensioner is coupled to the second portion of the cord, movement of second portion of the cord relative to the tensioner is prevented.

2. The system recited in claim 1, wherein the fastener is a hook.

3. The system recited in claim 1, further comprising a helmet, wherein the fastener is constructed and arranged to removably couple the first portion of the cord to the helmet.

4. The system recited in claim 3, further comprising a second object coupled to the system, wherein the second object is a helmet accessory.

5. The system recited in claim 1, further comprising a first fitting constructed and arranged to couple either the fastener to the cord or the tensioner to the cord, wherein the tensioner has a cavity constructed and arranged to receive at least a portion of the first fitting, and wherein the first fitting has an actively moveable element configured to retain the cord in the fitting when the first fitting is positioned in the tensioner cavity.

6. The system recited in claim 5, wherein the first fitting has a hole configured to receive a portion of the cord.

7. The system recited in claim 5, wherein the first fitting is configured to couple the tensioner to the second portion of the cord, the system further comprising:
  a second fitting constructed and arranged to couple the fastener to the first portion of the cord.

8. An attachment system comprising:
  a cord having a first portion, a second portion and a third portion, the third portion being between the first portion and the second portion of the cord, and the cord being made of an elastic material;
  a fastener coupled to the first portion of the cord;
  a tensioner coupled to the second portion of the cord, the tensioner configured to retain the third portion of the cord in the tensioner to maintain tension in the cord, and the tensioner is retaining the third portion of the cord;
  a first fitting coupling the tensioner to the second portion of the cord, wherein when the tensioner is coupled to the second portion of the cord, movement of the second portion of the cord relative to the tensioner is prevented; wherein the tensioner has at least one tooth positioned on a top portion of the opening and configured to grip the third portion of the cord;

the tensioner has at least one tooth positioned on a bottom portion of the opening and configured to grip the third portion of the cord; and the at least one tooth positioned on the top portion of the opening is not movable relative to the at least one tooth positioned on a bottom portion of the opening.

9. The attachment system recited in claim 8, wherein the tensioner has a plurality of teeth.

10. The attachment system recited in claim 8, wherein the tensioner has a plurality of teeth including at least one tooth positioned on a first side of the tensioner and at least one tooth positioned on a second side of the tensioner.

11. The attachment system recited in claim 8, wherein the tensioner has a first plurality of teeth positioned on a top portion of the opening and a second plurality of teeth positioned on a bottom portion of the opening.

12. The attachment system recited in claim 11, wherein the tensioner has a first concave surface adjacent the first plurality of teeth and a second concave surface adjacent the second plurality of teeth.

13. The attachment system recited in 8, wherein the tensioner has a concave surface adjacent the opening.

14. The attachment system recited in claim 8, wherein the tensioner has a cavity constructed and arranged to receive at least a portion of the first fitting, and wherein the first fitting has an actively moveable element configured to retain the cord when the first fitting is positioned in the tensioner cavity.

15. The attachment system recited in claim 14, wherein the first fitting has a hole configured to receive a portion of the cord.

16. The attachment system recited in claim 8, wherein the fastener is a hook.

17. The attachment system recited in claim 8, wherein the first fitting is configured to couple the tensioner to the second portion of the cord, the attachment system further comprising:

a second fitting constructed and arranged to couple the fastener to the first portion of the cord.

18. An attachment system comprising:

a cord having a first portion, a second portion and a third portion, the third portion being between the first portion and the second portion of the cord;

a fastener coupled to the first portion of the cord;

a tensioner coupled to the second portion of the cord, the tensioner having an opening extending therethrough, wherein the third portion of the cord extends through the opening and is gripped in the tensioner to maintain tension in the cord; and a fitting coupling the tensioner to the second portion of the cord, wherein the fitting includes an opening that extends axially within the fitting and toward the tensioner opening and receives the second portion of the cord; and wherein when the tensioner is coupled to the second portion of the cord, movement of second portion of the cord relative to the tensioner is prevented;

wherein the tensioner has a first plurality of teeth positioned on a top portion of the tensioner opening and a second plurality of teeth positioned on a bottom portion of the tensioner opening.

19. The attachment system of claim 18, wherein the cord comprises a bungee cord.

20. An attachment system comprising:

a cord having a first portion, a second portion and a third portion;

a fastener coupled to the first portion of the cord;

a tensioner coupled to the second portion of the cord, the tensioner configured to retain the third portion of the cord in the tensioner to maintain tension in the cord, and the tensioner is retaining the third portion of the cord; and a fitting coupling the tensioner to the second portion of the cord, wherein when the tensioner is coupled to the second portion of the cord, movement of the second portion of the cord relative to the tensioner is prevented;

wherein the tensioner includes an opening therethrough, and the tensioner has a first plurality of teeth positioned on a top portion of the opening and a second plurality of teeth positioned on a bottom portion of the opening;

wherein the fitting includes an opening that extends axially within the fitting and toward the tensioner opening and receives the second portion of the cord.

21. The attachment system of claim 20, wherein the cord comprises a bungee cord.

\* \* \* \* \*